United States Patent [19]
Mansmann

[11] 3,947,534
[45] Mar. 30, 1976

[54] PROCESSING OF ALUMINUM OXIDE FIBERS

[75] Inventor: Manfred Mansmann, Krefeld, Germany

[73] Assignee: Bayer Aktiengesellschaft, Leverkusen, Germany

[22] Filed: May 1, 1974

[21] Appl. No.: 465,952

[30] Foreign Application Priority Data
May 19, 1973 Germany.......................... 2325575

[52] U.S. Cl. .................. 264/62; 106/65; 106/73.4; 264/63; 264/DIG. 19
[51] Int. Cl.² .......................................... D02G 3/00
[58] Field of Search................ 264/29, 63, DIG. 19; 117/47 R, 169 A; 106/73.4, 57, 65, 62; 427/154, 156, 226

[56] References Cited
UNITED STATES PATENTS

| | | | |
|---|---|---|---|
| 3,104,943 | 9/1963 | Berry .......................... | 264/DIG. 19 |
| 3,231,540 | 1/1966 | Vanderbilt.................. | 264/DIG. 19 |
| 3,686,006 | 8/1972 | Horton................... | 264/63 |
| 3,760,049 | 9/1973 | Borer et al........................ | 264/63 |
| 3,793,041 | 2/1974 | Sowman............................. | 106/57 |
| 3,794,707 | 2/1974 | O'Neeill et al........................ | 264/56 |
| 3,846,527 | 11/1974 | Winter et al......................... | 264/63 |
| 3,853,688 | 10/1974 | D'Ambrosio.......................... | 106/65 |

Primary Examiner—Jay H. Woo
Attorney, Agent, or Firm—Burgess, Dinklage & Sprung

[57] ABSTRACT

In the production of aluminum oxide fibers comprising dry spinning an aluminum-containing solution to produce fiber and thereafter heat treating the fiber, the improvement which comprises applying to the fiber prior to heat treatment a solution of polyvinyl acetate in a solvent which is inert to the fiber. Advantageously the polyvinyl acetate is present in its solution in a concentration of about 0.1 to 10% by weight and is applied to the fiber in about 0.1 to 3 % by weight. The spinning solution may also contain $SiO_2$ and polyethylene oxide, and the polyvinyl acetate solution may also contain di-n-butyl phthalate as a plasticizer for the polyvinyl acetate. The fiber bundles are characterized by increased strength and resistance to breaking during further processing.

8 Claims, 1 Drawing Figure

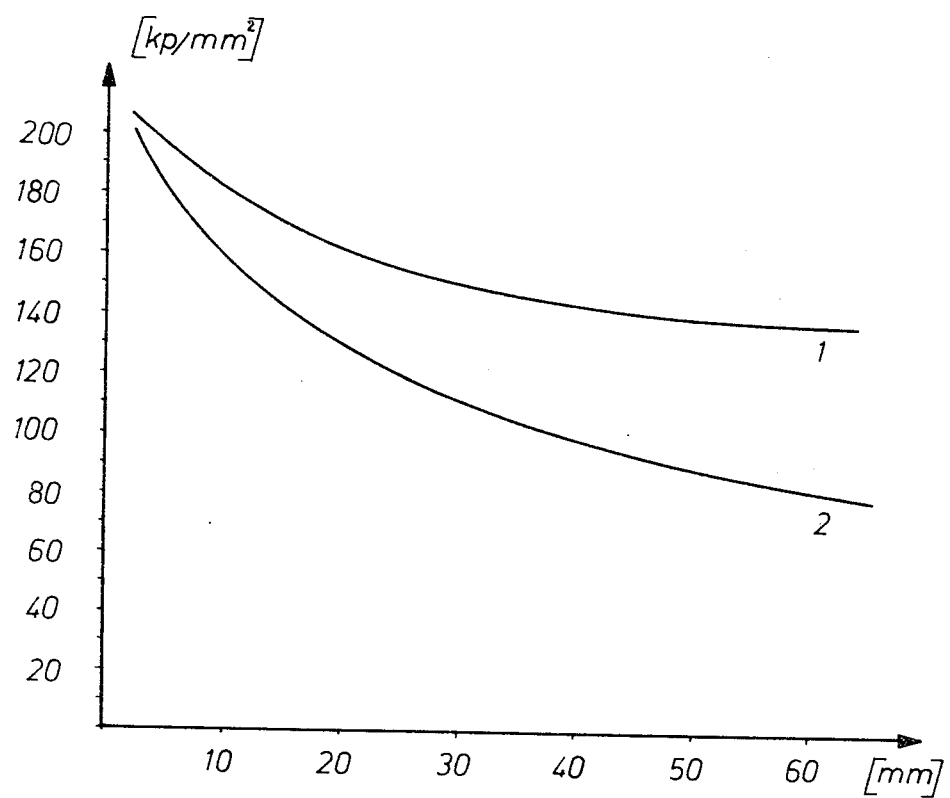

PROCESSING OF ALUMINUM OXIDE FIBERS

The present invention relates to treating aluminum-containing fibers prior to heat treatment in a manner which will increase the strength of the aluminum oxide fibers resulting from the heat treatment.

Processes have been disclosed for the production of inorganic fibers by spinning spinnable salt solutions or sol solutions by a dry spinning process to give salt fibers or gel fibers and subsequently converting these fibers by means of a heat treatment at an elevated temperature into the desired inorganic fibers. Such processes are described, for example, in German Auslegeschrift (German published specification) No. 1,249,832, German Offenlegungsschrift (German published specification) No. 1,494,552 or German Offenlegungsschrift (German published specification) No. 2,054,573.

It has heretofore been found that aluminum oxide fibers containing a proportion of $SiO_2$, a minor amount of carbon and optionally small amounts of modifying additives can be obtained by rendering the solution of an aluminum salt of a monobasic lower carboxylic acid and of a hydrolyzed silicic acid ester spinnable by adding a small amount of polyethylene oxide of high degree of polymerization, spinning the solution, preferably by a dry spinning process, such as is also customary for the preparation of organic synthetic fibers, to give fibers, and subsequently subjecting the fibers to a heat treatment at up to maximally 1,800°C. This gives fibers of which the mechanical properties depend on the nature of the heat treatment:

1. Aluminum oxide fibers which are amorphous according to X-rays; they are formed by a heat treatment between about 400°C and about 950°C. Typical values of their tensile strength are between 80 and 180 $kp/mm^2$ and of their E-modulus are between 9,000 and 14,000 $kp/mm^2$.

2. Polycrystalline $\gamma$-$Al_2O_3$ fibers; they result from a heat treatment at between about 950°C and 1,150°C. Their $SiO_2$ content is not detectable in the X-ray diagram. Typical values of their tensile strength lie between 100 and 270 $kp/mm^2$ and typical values of their E-modulus between 20,000 and 24,000 $kp/mm^2$.

3. Polycrystalline $\gamma$-$Al_2O_3$/mullite fibers; they are produced by a heat treatment at between about 1,200 and 1,400°C. Their strengths correspond to those of $\gamma$-$Al_2O_3$ fibers; their E-moduli are between 21,000 and 26,000 $kp/mm^2$. The X-ray diagram suggests the presence of $\delta$-$Al_2O_3$.

4. Polycrystalline $\alpha$-$Al_2O_3$/mullite fibers; they are produced by brief rapid heating of the other types to above about 1,400°C. The tensile strength and E-modulus are between 80 and 170, and 23,000 and 32,000, $kp/mm^2$, respectively.

The mechanical properties were determined with the aid of the "Tecam microtensile testing machine" of Messrs. Techne, Duxford, Cambridge (England), it being possible, in accordance with the construction of this apparatus, to use gauge lengths of 1 to 5 mm.

Because of their high strength and their high E-modulus the fibers are suitable for the production of high strength and stiff fiber reinforced composite materials. For this purpose the fibers can be used as continuous fibers, long staple fibers (a few cm – m) or short fibers (up to a few mm).

As compared to their tensile strength at 1 mm, their strength decreases by about 35 to 50% for 25 mm gauge length and by about 50 to 60% for 50 mm gauge length. On the other hand, the E-modulus of the fibers is independent of the length tested.

The phenomenon that the tensile strength of fibers depends on the length tested is generally known and can be explained by the fact that the fibers contain statistically distributed faults which reduce the strength. If the number of faults is large, the tensile strength will decrease more with the length tested than if the number of faults is small. One of the tasks in developing inorganic fibers is to produce fibers of as high a tensile strength as possible.

A further task has to be solved in carrying out the spinning process on an industrial scale. As a rule, the individual fibers issuing from the spinning column are grouped together by means of a thread guide to form a spun thread. They can then be wound up directly on a bobbin, in a defined form, by means of a variable drive, or be drawn off by a feed unit and passed on to a desired point. Here, the spun threads can be grouped together with other spun threads from other spinning columns to form gel fiber bundles and be fed, for example, to a cutting device. Another possibility is to wind up the gel fiber bundles on large stock bobbins or to lay them down in an orderly manner in intermediate containers, from which the fibres are subsequently passed to the heat treatment. For all these manipulations it is necessary — as has already been known for a long time from the technology of synthetic fibers — to provide the fibers with a coating of size in order to protect them mechanically. Only this makes possible the troubled-free re-winding of spun fibers. Without the friction-reducing size, the individual fibers would rub against one another, which leads to breakage of the salt fibers or gel fibers or produces faults on the surface of the fibers which manifest themselves as weak points in the finished filament.

A requirement which a sizing substance must meet is that it should not exert any undesired effects on the fibers during the heat treatment required for conversion into the inorganic fiber. In particular, there must be no adverse effect on the mechanical properties of the fibers and the fibers must not be stuck together by residues formed from the sizing substances during the heat treatment.

It is accordingly an object of the invention to provide a size for aluminum-containing fibers which will improve the strength of the aluminum oxide fibers ultimately obtained without undesired effects thereon.

These and other objects and advantages are realized in accordance with the present invention which relates to a process involving dry spinning an aluminum-containing solution to produce fiber, followed by heat treatment to form a strong aluminum oxide fiber. In accordance with the invention, prior to heat treatment there is applied to the fiber a solution of polyvinyl acetate in a solvent which is inert to the fiber.

The term "aluminum-containing solution" as employed herein has reference either to a true solution of a salt or a sol which produces gel fibers. The solution may contain other metals or metalloid ions which will not be volatilized during heat treatment in amounts up to the weight of aluminum and preferably only up to about 50% or more preferably 25% the weight of the aluminum, e.g., silicon, magnesium, lithium, boron, phosphorous, and the like. Similarly, carbon may be present in combined form and, if the heat treatment is effected under non-oxidizing conditions, carbon may be in the product in elemental form or as a metal carbide in up to about 10% by weight.

The invention is described below in relation to experiments which were carried out in the production of γ-Al$_2$O$_3$ fibers containing about 10% of SiO$_2$ and about 2% of carbon, both in a form amorphous to X-rays. The process can be applied in the same manner also to other fibers based predominantly on aluminum oxide. Processes for the production of such fibres have been described, for example, in U.S. Pat. Nos. 3,311,689, 3,322,865 and 3,503,765 and in German Offenlegungsschriften (German Published Specifications) Nos. 1,964,914, 2,037,963, 2,130,315 and 2,054,573.

To produce the fibres, 3.7 kg of aluminum granules (99.7% Al, about 2,000 ppm of Fe), 80 g of HgCl$_2$, 92 kg of H$_2$O and 12.6 kg of HCOOH are reacted, while stirring, in a V4A container of 200 l capacity, the temperature being kept at 70° to 80°C. After filtration, about 105 kg of aluminum diformate solution containing 6.8% of Al$_2$O$_3$ are obtained. Sufficient SiO$_2$ sol — produced by hydrolysis of Si(OC$_2$H$_5$)$_4$ — is added to this solution to bring the weight ratio of Al$_2$O$_3$: SiO$_2$ to 9:1. This mixture is concentrated at 50°C and 20 mm Hg to a total oxide concentration of 14.8%. A suspension of 80 g of polyethylene oxide (degree of polymerization about 100,000) in 250 g of CH$_3$OH is added to 9.67 kg of this solution, while stirring. The viscosity of the spinning solution is about 165 centipoise at 25°C. It is degassed and subsequently stored under nitrogen.

450 g/hour of the spinning solution, which is at 25°, are fed by means of a spinning pump through an annular spinneret with 100 orifices of 200 μm diameter, into a spinning column. To dry the fibers, the 300 mm wide and 6 m long spinning column is heated to 80° - 160°C and in addition air preheated to 80°C is passed in co-current over the fibers. The draw-off speed is usually 100 m/minute. After the heat treatment, the Al$_2$O$_3$ fibers have a diameter of 9 μ.

The size is applied at the end of the column by means of a roller which dips into the size solution and rotates slowly, the fibers being passed in front of this roller.

The use of pure solvents as sizes such as, for example, 1-chlorobutane, petroleum ether, toluene, xylene, styrene, dimethylformamide, methyl glycol, dioxane, n-propanol, i-octyl alcohol, chlorobenzene and others, admittedly makes it possible to draw off several spun threads by means of the feed unit, and to transport these threads and bring them together, but on the other hand presents no advantage, as compared to the pure gel fiber, with regard to its decrease in strength at larger gauge lengths.

Testing the sizes known from textile technology in the appropriate solvents inert to gel fibers in each case gave poorer mechanical properties than without sizing. Thus, for example, various silicone oils, paraffins, mineral oils, butyl stearate or low molecular polyethylene glycols were tested without success.

It was therefore particularly surprising to find experimentally that solutions of polyvinyl acetate in solvents which are inert towards the fibers, for example from the group of the alcohols, esters, ketones, hydrocarbons or chlorinated hydrocarbons, are suitable for use as sizes. Examples of solvents which can be used are i-octyl alcohol, dioxane, dimethylformamide, methyl glycol, acetophenone, toluene, xylene, styrene, 1-chlorobutane and chlorobenzene. Toluene and styrene are particularly preferred.

The invention will be further described with reference to the accompanying drawing wherein the sole FIGURE is a plot of tensile strength against gauge length of the fiber test specimen.

Each fiber tested was an Al$_2$O$_3$ fiber which was spun as described above and subsequently heated at a heating rate of 6°C/minute to 210°C, at 0.8°C/minute to 360°C and at 6°C/minute to 1,150°C. Curve (2) is for fibers produced without using a gel fiber size, and curve (1) for Al$_2$O$_3$ fiber produced in the same way but with gel fiber sizing [2% of polyvinyl acetate in styrene]. The improvement in the tensile strength of the fiber sized in the gel state as compared to the unsized fiber is considerable in the case of large gauge lengths. The E-modulus of the Al$_2$O$_3$ fibers produced in this way is about 20,500 kp/mm$^2$.

In testing the concentration dependence of the effect of the size, as little as 0.1% of polyvinyl acetate in styrene or toluene produced a noticeable favorable effect and fibers sized with 10% of polyvinyl acetate were also distinctly superior to unsized fibers. The most advantageous range with regard to the fiber properties, ease of handling during re-winding and economical use of size was approximately between 0.5 and 3% of polyvinyl acetate in the sizing solution. The amounts applied to the fibers in that case lie in the range of about 0.1 to 3% of size, preferably in the range of about 0.3 to 1,5% of size, relatively to the weight of the gel fibers.

The polyvinyl acetate used according to the invention is characterized by the linking of a large number of the following monomer units:

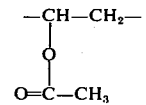

The degree of polymerization is in general between 200 and 5,000, which corresponds to molecular weights of about 17,000 to about 430,000. In addition to the linear linking of the monomer units, a generally small number of branch points can be present in the molecule. The polyvinyl acetate to be used according to the invention is furthermore to be understood to include products in which a part of the acetate groups is replaced by radicals of other organic acids, for example formate, propionate or butyrate groups, or in which vinyl acetate is copolymerized with other unsaturated compounds, such as, for example, with ethylene, acrylic acid esters or maleic acid esters. Preferably the vinyl acetate units are present in a major amount by weight.

With increasing concentration of size in styrene it was found that the cakes became progressively stiffer and that finally there was the danger — very particularly if the gel fibers were dried thoroughly, say at 60°C in a drying cabinet, before their heat treatment — that the fibers break when bent sharply. It was possible to counteract this to a certain degree by addition of plasticizers without thereby adversely influencing the tensile strength of the finished fibers. For this purpose, di-n-butyl phthalate, which can be added to the size in amounts of up to 100% by weight or more, relative to the amount of the polyvinyl acetate, has proved particularly suitable.

Table I summarizes experiments with Al$_2$O$_3$ fibers which have been produced from the spinning solution described above (by spinning in a laboratory spinning column with only one nozzle), the fibers produced from one batch of spinning solution being grouped together in each case. The heat treatment of the gel fibers was in each carried out in the same way: 1 – 2 g of gel fibers were suspended from a quartz hook in a tube of 32 mm internal diameter and heated to 1,150°C in an oven, at a heating rate of 6°C/minute. At the same time, nitrogen flowed upwards through the tube. When the final temperature was reached, the tube containing the fibers was rapidly removed from the hot zone. Up to the time that the individual portions of experimental material were heat-treated, they were stored, after spinning, in a drying cabinet at 60°C. The tensile strength of the $Al_2O_3$ fibers was measured at 25 mm gauge length. The polyvinyl acetate used for sizing had a molecular weight of about 37,000.

Table 2 reports on a series of experiments with $Al_2O_3$ fibers which were spun as described from a 100 hole spinneret in a 6 m column. The cakes were stored in closed vessels until required for the heat treatment. For the heat treatment, 14 – 20 cm long pieces from this cake were either suspended from a quartz hook in a tube of 32 mm internal diameter or heated in a tube of 40 mm internal diameter of which the lower part was filled with quartz packings, the pieces resting on the packing. Nitrogen was passed in from below. The heating rate was 6°/minute up to 210°C, 0.8°/minute from 210° to 360°C and 6°/minute from 360°C to 1,150°C. At 1,150°C the temperature was maintained for ½ hour and the fibers were then rapidly removed from the hot zone. To test the effectiveness of the sizing, the tensile strength values at 25 mm gauge length were again determined. As in the case of the results summarized in Table 1, the fibers from the 100 hole spinneret also showed the marked advance over fibers without a gel fiber sizing.

In addition to increasing the strength, the sizing of the gel fibers makes the latter outstandingly suitable for drawing-off by means of a feed unit, for continuous conveying over substantial distances and for re-winding, while uncoated gel fibers are rather unsuitable for these operations. With uncoated fibers, the spun threads repeatedly tear because of individual elementary fibers breaking.

The dry spinning process can also be carried out without a spinneret and column, for example by centrifuging thread-pulling salt solutions or sol solutions, say through orifices on the circumference of a cylinder rotating at high speed. The short salt fibers or gel fibers formed in this way are then dipped into the size solution, or sprayed therewith, before the heat treatment.

It will be appreciated that the instant specification and examples are set forth by way of illustration and not limitation, and that various modifications and changes may be made without departing from the spirit and scope of the present invention.

What is claimed is:

1. In the production of aluminum oxide fibers comprising dry spinning an aluminum compound-containing solution or sol to produce fiber and thereafter heat treating the fiber, the improvement which comprises applying to the fiber prior to heat treatment a solution of polyvinyl acetate in a solvent which is inert to the fiber.

2. The process of claim 1 wherein the polyvinyl acetate is present in its solution in a concentration of about 0.1 to 10% by weight and is applied to the fiber in about 0.1 to 3% by weight.

3. The process of claim 2 where the polyvinyl acetate solvent comprises toluene or styrene.

4. The process of claim 1 wherein the polyvinyl acetate solution also contains a plasticizer for the polyvinyl acetate in up to about 100% by weight of the polyvinyl acetate.

5. The process of claim 4 wherein the plasticizer is di-n-butyl phthalate.

Table 1

| | Results of laboratory spinning experiments. | | |
|---|---|---|---|
| Example | Sizing | Size on gel fiber % | Tensile strength kp/mm² |
| 1A | no sizing | 0 | 105 |
| 1B | 1% polyvinyl acetate in styrene | 0,4 | 150 |
| 1C | 5% polyvinyl acetate in styrene | 2,2 | 150 |
| 2A | no sizing | 0 | 110 |
| 2B | 3% polyvinyl acetate in styrene | 0,9 | 155 |
| 2C | 5% polyvinyl acetate in styrene | 2,4 | 177 |
| 3A | no sizing | 0 | 116 |
| 3B | 2.5% polyvinyl acetate + 1.2% di-n-butyl phthalate in styrene | 1,3 | 165 |
| 4A | no sizing | 0 | 116 |
| 4B | 5% polyvinyl acetate + 2.5% di-n-butyl phthalate in toluene | 2,6 | 156 |

Table 2

| | Results of spinning experiments with 100 hole spinneret. Sizing with 2% polyvinyl acetate + 1% di-n-butyl phthalate, providing about 1% of size on the weight of the gel fiber | | | |
|---|---|---|---|---|
| Example | weight of sample, g | Tube φ mm | Tensile strength, kp/mm² | Notes |
| 5A | 2.6 | 32 | 90 | no sizing |
| 5B | 45.8 | 40 | 92 | no sizing |
| 5C | 8.3 | 32 | 162 | styrene as the solvent |
| 5D | 47.6 | 40 | 150 | styrene as the solvent |
| 5E | 2.65 | 32 | 155 | toluene as the solvent |
| 5F | 48.2 | 40 | 135 | toluene as the solvent |

6. The process of claim 5, wherein the solvent is toluene or styrene the polyvinyl acetate is present therein in a concentration of about 0.5 to 3% by weight and is applied to the fiber in about 0.3 to 1.5% by weight.

7. The process of claim 6 wherein the spinning solution or sol further contains $SiO_2$ and polyethylene oxide.

8. In the processing of an aluminum oxide fiber bundle, the improvement which comprises employing as said bundle a material carrying thereon about 0.1 to 3% by weight of polyvinyl acetate as a sizing agent.

* * * * *